United States Patent
Shimomura

(10) Patent No.: US 10,929,120 B2
(45) Date of Patent: Feb. 23, 2021

(54) VEHICLE-MOUNTED DEVICE VALIDITY DETERMINATION SYSTEM AND INFORMATION COLLECTING DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Yoshikuni Shimomura, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 6 days.

(21) Appl. No.: 16/343,455

(22) PCT Filed: Oct. 18, 2017

(86) PCT No.: PCT/JP2017/037734
§ 371 (c)(1),
(2) Date: Apr. 19, 2019

(87) PCT Pub. No.: WO2018/079385
PCT Pub. Date: May 3, 2018

(65) Prior Publication Data
US 2019/0265966 A1      Aug. 29, 2019

(30) Foreign Application Priority Data
Oct. 25, 2016    (JP) .............................. JP2016-208578

(51) Int. Cl.
*G06F 8/65*      (2018.01)
*B60R 16/023*   (2006.01)
(Continued)

(52) U.S. Cl.
CPC ................ *G06F 8/65* (2013.01); *B60R 16/02* (2013.01); *B60R 16/023* (2013.01); *G06F 8/60* (2013.01);
(Continued)

(58) Field of Classification Search
None
See application file for complete search history.

(56) References Cited

U.S. PATENT DOCUMENTS

2005/0192716 A1    9/2005  Ito et al.
2009/0077159 A1*   3/2009  Murakami .......... H04L 67/2842
                                                                          709/202
(Continued)

FOREIGN PATENT DOCUMENTS

| JP | 2011148398 A | 8/2011 |
|---|---|---|
| JP | 2016111477 A | 6/2016 |

OTHER PUBLICATIONS

International Search Report, Application No. PCT/JP2017/037734, dated Jan. 16, 2018. ISA/Japan Patent Office.

*Primary Examiner* — Qing Chen
(74) *Attorney, Agent, or Firm* — Honigman LLP

(57) ABSTRACT

A vehicle-mounted device determination system capable of determining validity of a vehicle-mounted device, and an information collecting device are provided. The vehicle-mounted device determination system includes: an information collecting device communicating with one or more vehicle-mounted devices installed in a vehicle; an identification information acquiring unit acquiring identification information from the vehicle-mounted devices; and an identification information transmitting unit transmits the identification information acquired by the identification information acquiring unit, and the server including: an identification information storage unit storing valid identification information of a vehicle-mounted device an identi- (Continued)

fication information receiving unit receives the identification information from the vehicle; a validity determining unit determines, whether a vehicle-mounted device associated with the identification information received by the identification information receiving unit is valid; and a notifying unit provides notification if the validity determining unit determines that the vehicle-mounted device is invalid.

9 Claims, 11 Drawing Sheets

(51) Int. Cl.
G06F 21/44 (2013.01)
G06F 11/00 (2006.01)
B60R 16/02 (2006.01)
G06F 9/445 (2018.01)
G06F 8/60 (2018.01)

(52) U.S. Cl.
CPC .............. *G06F 9/445* (2013.01); *G06F 11/00* (2013.01); *G06F 21/44* (2013.01)

(56) References Cited

U.S. PATENT DOCUMENTS

| | | | |
|---|---|---|---|
| 2012/0124571 A1* | 5/2012 | Nagai | G06F 11/1433 717/173 |
| 2013/0261888 A1* | 10/2013 | Nagai | H04M 1/7253 701/36 |
| 2014/0162623 A1* | 6/2014 | Nagai | G08G 1/168 455/419 |
| 2015/0113521 A1* | 4/2015 | Suzuki | G06F 8/65 717/173 |
| 2015/0181631 A1* | 6/2015 | Lee | H04B 1/40 455/41.2 |
| 2016/0219051 A1 | 7/2016 | Morita et al. | |
| 2016/0378457 A1* | 12/2016 | Adachi | H04L 63/123 713/181 |
| 2018/0018160 A1 | 1/2018 | Teraoka et al. | |

* cited by examiner

VEHICLE-MOUNTED DEVICE VALIDITY DETERMINATION SYSTEM AND INFORMATION COLLECTING DEVICE

CROSS-REFERENCE TO RELATED APPLICATIONS

This application is the U.S. national stage of PCT/JP2017/037734 filed Oct. 18, 2017, which claims priority of Japanese Patent Application No. JP 2016-208578 filed Oct. 25, 2016.

TECHNICAL FIELD

The present disclosure relates to a vehicle-mounted device determination system that determines the validity of a vehicle-mounted device installed in a vehicle and to an information collecting device included in this system.

BACKGROUND

A plurality of vehicle-mounted devices, such as ECUs (Electronic Control Units), are customarily installed in a vehicle. The ECUs are connected to each other via communication lines, such as a CAN (Controller Area Network) bus, to be able to transmit and receive information to and from each other. Each of the ECUs performs various processes, such as vehicle control. To do so, the ECU includes a processing device, such as a CPU (Central Processing Unit), that reads and executes a program stored in a storage unit, such as a flash memory or EEPROM (Electrically Erasable Programmable Read Only Memory). In the case of, for example, adding functions, correcting malfunctions, or version upgrades, an update process needs to be performed to rewrite the program or data stored in the storage unit of the ECU into a new program or new data. In this case, the update program or the update data is transmitted via the communication line to the ECU that is subject to the update process.

Japanese Unexamined Patent Application Publication No. 2007-11734 discloses a system including a master control device that acquires rewrite data from an external management center, temporarily stores the acquired data into a memory device, determines the appropriateness of the stored rewrite data, and rewrites data stored in an electronic control device of a vehicle using the appropriate data.

After the vehicle is manufactured or sold, the system configuration of the vehicle may be changed when an ECU is additionally connected to an in-vehicle network or when an ECU is replaced, for example. Such ECU addition or replacement is not necessarily performed by an authorized place, such as a vehicle dealer. For example, the user may purchase an ECU and additionally connect the purchased ECU to the in-vehicle network. In this case, since the ECU additionally connected by the user is not always a genuine (legitimate) product, the vehicle-mounted system may possibly be adversely affected. Moreover, there is a possibility that a malicious device may be connected to the in-vehicle network.

The system disclosed in Japanese Unexamined Patent Application Publication No. 2007-11734 determines whether the rewrite data acquired from the external management center is appropriate. However, verification whether the in-vehicle electronic control device which is subject to rewriting is valid is not performed at all. However, if an invalid ECU is connected to the in-vehicle network, the program or the data should not be rewritten.

The present disclosure was conceived in view of the above circumstances, and it is an object of the present disclosure to provide: a vehicle-mounted device determination system capable of determining whether a vehicle-mounted device installed in a vehicle is valid; and an information collecting device.

SUMMARY

A vehicle-mounted device determination system according to the present disclosure includes: an information collecting device including: a communication unit that communicates with one or more vehicle-mounted devices installed in a vehicle; an identification information acquiring unit that acquires identification information from the vehicle-mounted devices through communication performed by the communication unit; and an identification information transmitting unit that transmits, to a server provided outside the vehicle, the identification information acquired by the identification information acquiring unit, and the server including: an identification information storage unit that stores identification information of a vehicle-mounted device that is valid and that can be installed in the vehicle; an identification information receiving unit that receives the identification information from the vehicle; a validity determining unit that determines, based on the identification information stored in the identification information storage unit and the identification information received by the identification information receiving unit, whether a vehicle-mounted device associated with the identification information received by the identification information receiving unit is valid; and a notifying unit that provides notification if the validity determining unit determines that the vehicle-mounted device is invalid.

Moreover, the server in vehicle-mounted device determination system according to the present disclosure includes: an update program storage unit that stores an update program used for updating a program to be executed by the vehicle-mounted device that is valid and that can be installed in the vehicle; an update determining unit that determines whether the program of the vehicle-mounted device is to be updated; and an update program transmitting unit that, if the validity determining unit determines that the vehicle-mounted device is valid and the update determining unit determines that the program is to be updated, reads the update program for the vehicle-mounted device from the update program storage unit and transmits the update program to the information collecting device of the vehicle including the vehicle-mounted device. The information collecting device in vehicle-mounted device determination system according to the present disclosure includes: an update program receiving unit that receives the update program from the server; and an update program transmitting unit that transmits the update program received by the update program receiving unit to the vehicle-mounted device that is to be updated.

Furthermore, the server in the vehicle-mounted device determination system according to the present disclosure includes an update prohibiting unit that prohibits the update program transmitting unit from transmitting the update program even though the update determining unit determines that the program is to be updated, when the vehicle including the vehicle-mounted device that is to be updated includes a vehicle-mounted device determined to be invalid by the validity determining unit.

Moreover, in the vehicle-mounted device determination system according to the present disclosure, the notifying unit of the server provides notification to the information collecting device that is a transmission source of the identification information received by the identification information receiving unit. The information collecting device includes a display processing unit that performs, in response to the notification from the server, a process of displaying notification information on a display unit provided for the vehicle.

Furthermore, in the vehicle-mounted device determination system according to the present disclosure, the notifying unit of the server provides notification to a mobile wireless communication device.

Moreover, in the vehicle-mounted device determination system according to the present disclosure, the information collecting device includes a condition determining unit that determines whether the identification information acquired by the identification information acquiring unit satisfies a predetermined condition. If the condition determining unit determines that the predetermined condition is not satisfied, the identification information transmitting unit transmits the identification information to the server.

Furthermore, in the vehicle-mounted device determination system according to the present disclosure, the information collecting device includes a storage unit that stores the identification information acquired by the identification information acquiring unit. The condition determining unit makes determination according to the predetermined condition whether the identification information acquired by the identification information acquiring unit is the same as the identification information stored in the storage unit.

Moreover, an information collecting device according to the present disclosure includes: a communication unit that communicates with one or more vehicle-mounted devices installed in a vehicle; an identification information acquiring unit that acquires identification information of the vehicle-mounted devices through communication performed by the communication unit; a condition determining unit that determines whether the identification information acquired by the identification information acquiring unit satisfies a predetermined condition; and an identification information transmitting unit that, if the condition determining unit determines that the predetermined condition is not satisfied, transmits the identification information acquired by the identification information acquiring unit to a server provided outside the vehicle.

According to the present disclosure, the information collecting device installed in the vehicle communicates with one or more vehicle-mounted devices, collects the identification information of these vehicle-mounted devices, and transmits the collected identification information to the server provided outside the vehicle. The server stores, as a list for example, the identification information of valid vehicle-mounted devices, and determines whether a vehicle-mounted device having the identification information received from the information collecting device of the vehicle is valid. By determining whether the identification information received from the information collecting device is included in the stored list of the valid identification information, the server can determine whether the vehicle-mounted device having this identification information is valid. If it is determined that the vehicle-mounted device is invalid, the server provides notification. The list of the identification information of the valid vehicle-mounted devices has an enormous amount of data, and addition and correction may be frequently performed on the list. Thus, with a configuration in which the server stores such information and determines whether the vehicle-mounted device is valid, the determination as to the validity can be performed more accurately.

Moreover, according to the present disclosure, the server stores an update program used for updating a program or data stored in the vehicle-mounted device (hereinafter, simply referred to as the program). The server determines whether the program of the vehicle-mounted device needs to be updated. Then, the server transmits the update program to the information collecting device of the vehicle including the vehicle-mounted device that is determined as being valid and as having the program that needs to be updated. Receiving the update program from the server, the information collecting device performs the update process by transmitting the received update program to the vehicle-mounted device that is to be updated. With this, the server transmits the update program only to the valid vehicle-mounted device, and the update process is prohibited from being performed on the program of the invalid vehicle-mounted device.

Furthermore, according to the present disclosure, the server does not transmit the update program even if it is determined that the program needs to be updated, when the vehicle including the vehicle-mounted device that is to be updated includes a vehicle-mounted device determined to be invalid. With this, the update process can be prevented from being performed on the vehicle that may have some kind of abnormality.

Moreover, according to the present disclosure, if it is determined that the vehicle-mounted device is invalid on the basis of the identification information received from the information collecting device, the server provides notification, to the information collecting device that is the transmission source of this identification information, that the vehicle-mounted device is invalid. Receiving this notification, the information collecting device notifies the user of the information on the vehicle-mounted device determined to be invalid, by causing the display unit provided for the vehicle to display the information. With this, the user of the vehicle can find that an invalid vehicle-mounted device is installed in the vehicle.

Furthermore, according to the present disclosure, if it is determined that the vehicle-mounted device is invalid on the basis of the identification information received from the information collecting device, the server provides notification to a mobile wireless communication device. The mobile wireless communication device may be a mobile phone or smartphone owned by the user of the vehicle. For example, the server can store, for each of the vehicles, the information on the wireless communication device that is the notification destination. If it is determined that the vehicle-mounted device is invalid, the server can provide a notification to the stored notification destination. With this, even if not riding in the vehicle, the user can receive the notification with the wireless communication device and find that an invalid vehicle-mounted device is installed in the vehicle.

Moreover, according to the present disclosure, the information collecting device determines whether the identification information collected from the vehicle-mounted device satisfies a predetermined condition. For example, the information collecting device can periodically acquires the identification information from the vehicle-mounted device and stores the acquired identification information. Then, the information collecting device makes the determination according to the predetermined condition whether the stored identification information is the same as the newly-acquired identification information. Thus, whether there is an addition or change to the vehicle-mounted devices installed in the vehicle can be determined. If it is determined that the predetermined condition is not satisfied, the information collecting device transmits the newly-acquired identification information to the server. Thus, if the predetermined condition is satisfied, the information collecting device does not transmit the identification information to the server. With this, frequency of communication between the information collecting device and the server can be reduced.

Advantageous Effects of Disclosure

According to the present disclosure, the information collecting device transmits the identification information acquired from the vehicle-mounted device to the server, and the server determines on the basis of the received identification information whether the vehicle-mounted device is valid. With this configuration, whether the vehicle-mounted device installed in the vehicle is valid can be determined accurately.

DETAILED DESCRIPTION OF PREFERRED EMBODIMENTS

Embodiment 1

Figure 1:
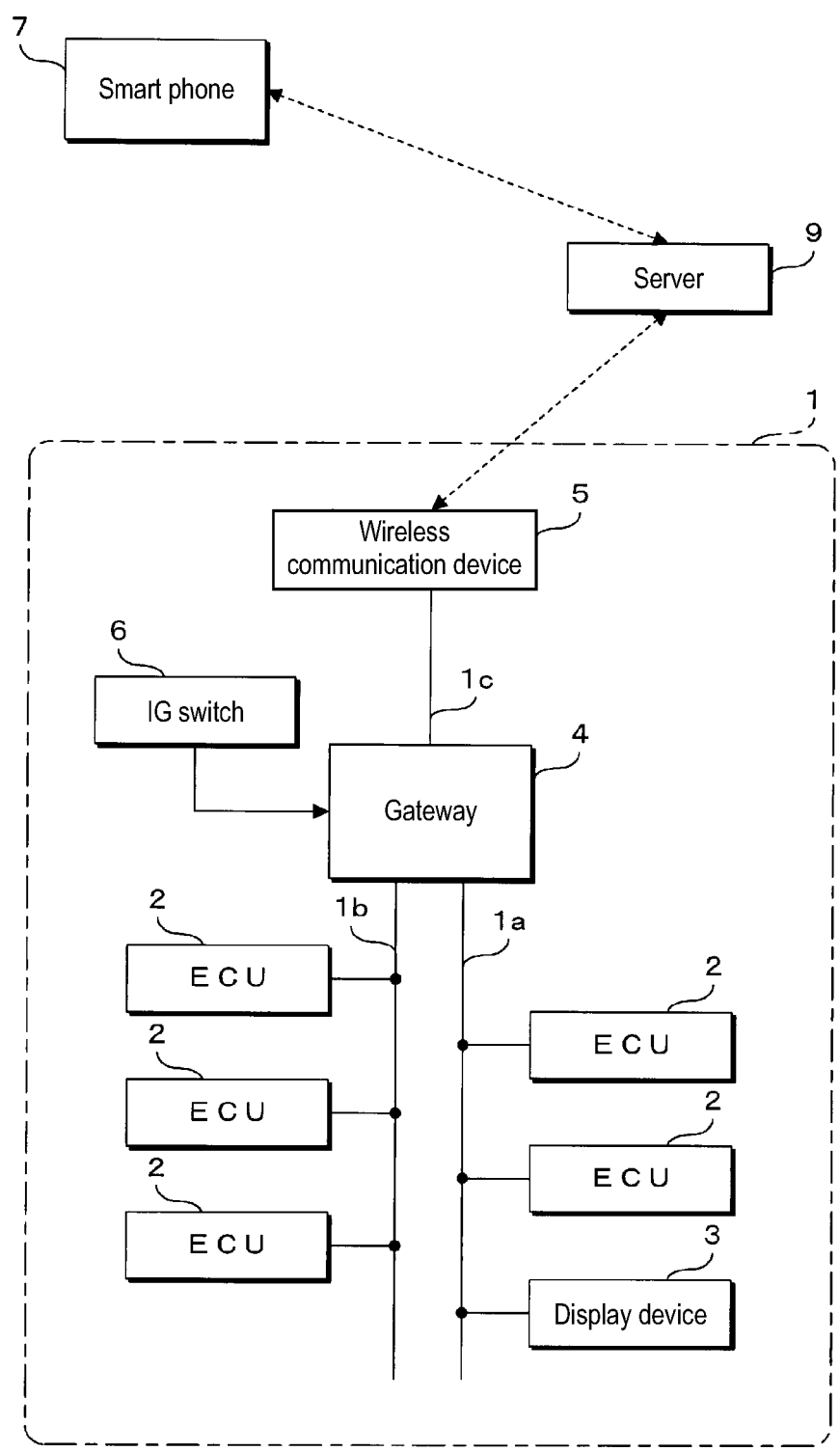
FIG. 1 is a schematic diagram showing a configuration of a vehicle-mounted device determination system according to the present embodiment.

FIG. 1 is a schematic diagram showing a configuration of a vehicle-mounted device determination system according to the present embodiment. The vehicle-mounted device determination system according to the present embodiment includes a plurality of ECUs (Electronic Control Units) 2 that are installed in a vehicle 1 and communicate with each other via communication lines 1a and 1b and a gateway 4 disposed in the vehicle 1. In the vehicle-mounted device determination system according to the present embodiment, the gateway 4 corresponds to an information collecting device and each of the ECUs 2 corresponds to a vehicle-mounted device. The example shown in the diagram has a system configuration in which two of the ECUs 2 and a display device 3 are connected to the communication line 1a disposed in the vehicle; three of the ECUs 2 are connected to the communication line 1b; and the two communication lines 1a and 1b are connected to the gateway 4. Communication relay performed by the gateway 4 between the communication lines 1a and 1b allows each of the ECUs 2 to transmit and receive data to and from the other ECUs 2 or the display device 3. Moreover, an IG signal is input from an IG switch of the vehicle 1 to the gateway 4.

The vehicle-mounted device determination system according to the present embodiment includes a wireless communication device 5 connected to the gateway 4 via a communication line 1c. Via the wireless communication device 5, the gateway 4 can communicate with a server 9 provided outside the vehicle 1. Data transmission and reception between the server 9 and the wireless communication device 5 is achieved by communication via, for example, a mobile phone communication network and the Internet. The server 9 can communicate with a smartphone 7 owned by a user of the vehicle 1, for example.

For example, the ECUs 2 include various ECUs, such as an ECU that controls operation of an engine of the vehicle 1, an ECU that controls door locking-unlocking, an ECU that controls turning on-off of lights, an ECU that controls airbag operation, and an ECU that controls ABS (Antilock Brake System) operation. Each of the ECUs 2 is connected to the communication line 1a or 1b disposed in the vehicle 1, and can perform data transmission and reception with the other ECUs 2, the display device 3, and the gateway 4 via the communication lines 1a and 1b.

The display device 3 is, for example, a liquid crystal display and performs operation, such as displaying a message for the user of the vehicle 1 in response to a display order given by the ECU 2 or the gateway 4. Although not shown, the display device 3 has an operation unit, such as a touch panel or hardware keys. When receiving a user operation, the display device 3 notifies the ECU 2 or the gateway 4 of the received operation details. Here, the display device 3 may be shared with a car navigation device, for example.

The gateway 4 is connected to the communication lines 1a to 1c included in the in-vehicle network of the vehicle 1, and relays data transmission and reception among the communication lines. In the example shown in FIG. 1, the gateway 4 is connected to the three communication lines 1a to 1c. To be more specific, the gateway 4 is connected to: the first communication line 1a connected to the two ECUs 2 and the display device 3; the second communication line 1b connected to the three ECUs 2; and the third communication line 1c connected to the wireless communication device 5. The gateway 4 relays data by receiving the data from one of the communication lines 1a to 1c and transmitting the received data to the rest of the communication lines 1a to 1c.

The gateway 4 according to the present embodiment periodically performs a process to acquire identification information from each of the ECUs 2 installed in the vehicle 1. The identification information of the ECU 2 may include, for example, a serial number (production number) assigned to the device itself of the ECU 2 and/or version information of the program stored in the ECU 2. For example, the gateway 4 according to the present embodiment acquires the identification information of the ECU 2 whenever the IG switch 6 of the vehicle 1 is switched to an On state, and then transmits the acquired identification information to the server 9.

The wireless communication device 5 can perform information transmission and reception (i.e. exchange information) with the serve device 9 through wireless communication via the mobile phone communication network or a wireless LAN (Local Area Network), for example. The wireless communication device 5 is connected to the gateway 4 via the communication line 1c, and thus can perform information transmission and reception with the gateway 4 through cable communication. With this, the wireless communication device 5 can relay communication between the gateway 4 and the server 9. The wireless communication device 5 transmits, to the server 9, the data received from the gateway 4, and also transmits, to the gateway 4, the data received from the server 9.

The IG switch 6 is used by the user to start the engine of the vehicle 1, and switches between two states, that is, the On state and an Off state. In the present embodiment, an IG signal indicates the state of the IG switch 6. An IG-On signal indicates that a prime mover, such as the engine, of the vehicle 1 is operating and that power is being generated by, for example, an alternator. An IG-Off signal indicates that the prime mover of the vehicle 1 is at rest and that no power is being generated.

The server 9 manages and stores data and a program to be executed by the ECU 2 installed in the vehicle 1. In response to an inquiry from the vehicle 1, the server 9 gives a notification whether the program, for example, needs to be updated. If updating is required, the server 9 performs a process to deliver an update program and data to the vehicle 1.

In the present embodiment, communication between the gateway 4 and the server 9 is carried out while the engine of the vehicle 1 is operating, for example. The gateway 4 acquires (downloads) a program and/or data necessary for updating from the server 9. Then, at a predetermined update timing after the engine of the vehicle 1 stops (after the IG switch 6 is switched to the Off state) the next time after the completion of acquisition of the program and/or the data necessary for updating, the gateway 4 performs an update process by transmitting the program and/or the data acquired from the server 9 to the ECU 2 that is to be updated. Receiving the program and/or the data necessary for updating from the gateway 4, the ECU 2 performs an update process by writing this program and/or this data into a storage unit of this ECU 2.

Moreover, the server 9 according to the present embodiment stores, as a list, the identification information of all the valid ECUs 2 that are valid and that can be installed in the vehicle 1. When the identification information of the ECU 2 collected by the gateway 4 of the vehicle 1 is received, the server 9 determines whether the ECU 2 having the received identification information is valid by determining whether the received identification information is included in the stored identification information list. If it is determined that this ECU 2 is invalid, the server 9 notifies the gateway 4 of the vehicle 1 having this ECU 2 about an abnormality. Receiving the notification about the abnormality from the server 9, the gateway 4 gives a display order to the display device 3 to display a message notifying the user of the abnormality.

Furthermore, the server 9 stores information on the smartphone 7 owned by the user, as information on a notification destination of the user of the vehicle 1. The information on the smartphone 7 may be a phone number or an email address of the smartphone 7, and is used for designating a transmission destination when the server 9 transmits information to the smartphone 7. If it is determined that the ECU is invalid on the basis of the identification information received from the gateway 4, the server 9 notifies, about the abnormality, the smartphone 7 registered as the notification destination of the vehicle 1 in which this ECU 2 is installed. When receiving the notification about the abnormality from the server 9, the smartphone 7 displays a message to notify the user of the abnormality. In the present embodiment, the message is displayed by the display device 3. However, this is not intended to be limiting, and a different method may be adopted. For example, an audio message may be output using an audio output device.

Moreover, the server 9 performs a process of transmitting an update program used for the update process performed on the ECU 2. Here, when even just one of the ECUs 2 installed in the vehicle 1 is determined to be invalid, the server 9 does not transmit the update program to the vehicle 1 even if this update program is for the ECU 2 determined as being valid.

Figure 2:
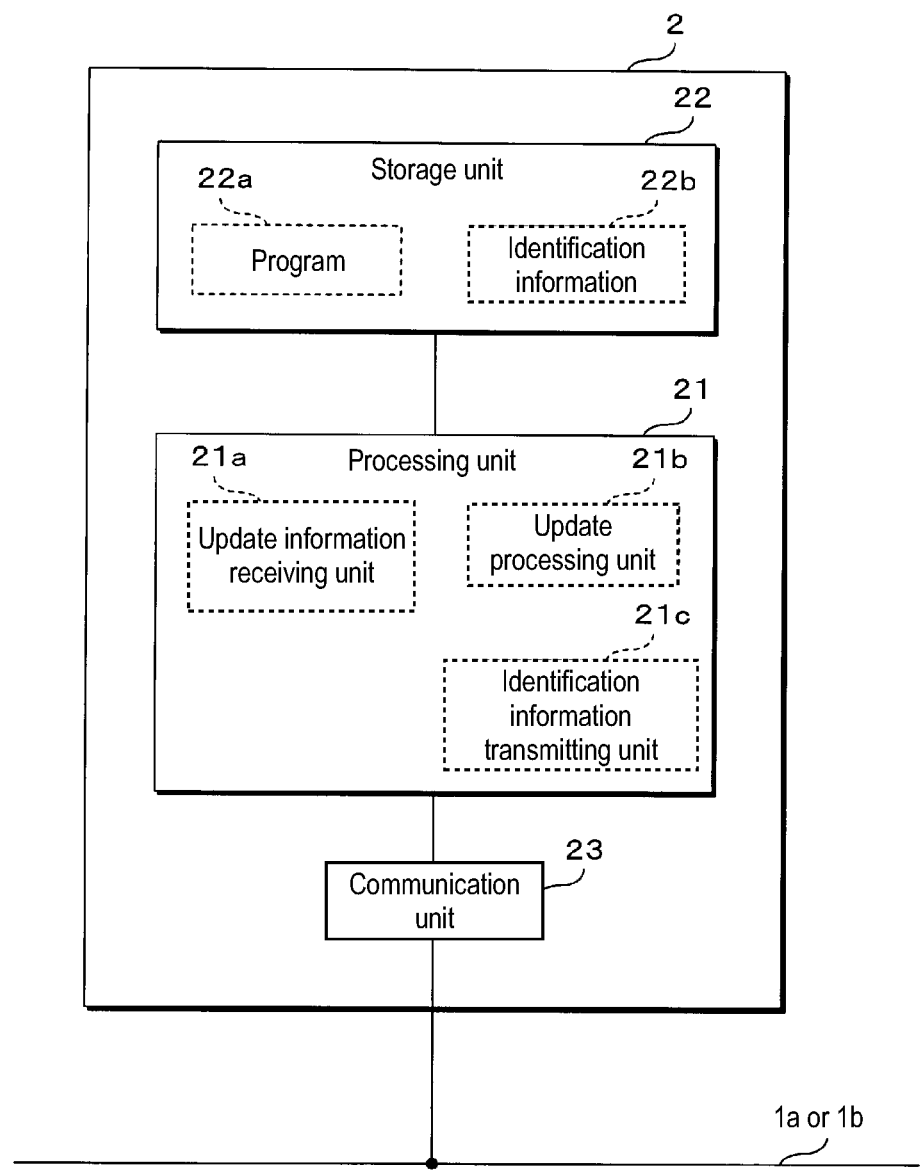
FIG. 2 is a block diagram showing a configuration of an ECU.

FIG. 2 is a block diagram showing a configuration of the ECU 2. Note that FIG. 2 shows functional blocks common to the ECUs 2 and does not show functional blocks different for each of the ECUs 2. The ECU 2 according to the present embodiment includes a processing unit 21, a storage unit 22, and a communication unit 23. The processing unit 21 is made up of an arithmetic processing unit, such as a CPU (Central Processing Unit) or an MPU (Micro-Processing Unit). The processing unit 21 performs various arithmetic processes by reading and executing a program 22a stored in the storage unit 22. Here, the program 22a stored in the storage unit 22 is different in content for each of the ECUs 2.

The storage unit 22 is made up of a nonvolatile memory element, such as a flash memory or EEPROM. The storage unit 22 stores the program 22a to be executed by the processing unit 21 and data necessary to execute the program 22a. It should be noted that the simple expression "the program 22a" in the following may refer to both the program 22 and the data necessary to execute the program 22a.

The storage unit 22 according to the present embodiment stores identification information 22b having a different value for each of the ECUs 2. The identification information 22b may include, for example, a serial number or production number assigned to each device of the ECUs 2 and version information of the program 22a. The serial number or production number of the ECU 2 is assigned at the time of manufacture of the ECU 2 and stored into the storage unit 22. The version information of the program 22a has a value updated whenever an update process is performed on the program 22a. Although the identification information 22b is stored into the storage unit 22 that stores the program 22a in the present embodiment, this is not intended to be limiting. The identification information 22b may be stored into a different memory, for example. In this case, the identification information 22b may be stored in a distributed manner, such as in a case where the version information of the program 22a may be stored into the storage unit 22 and the serial number or production number of the ECU 2 may be stored into a different ROM (Read Only Memory).

The communication unit 23 is connected to the communication line 1a or 1b included in the in-vehicle network, and performs data transmission and reception according to a communication protocol, such as CAN (Controller Area Network). The communication unit 23 transmits data by converting data received from the processing unit 21 into an electrical signal and outputting the electrical signal to the communication line 1a or 1b. Moreover, the communication unit 23 receives data by acquiring the potential of the communication line 1a or 1b through sampling, and then transmits the received data to the processing unit 21.

Furthermore, the processing unit 21 of the ECU 2 according to the present embodiment includes an update information receiving unit 21a, an update processing unit 21b, and an identification information transmitting unit 21c. Each of the information receiving unit 21a, the update processing unit 21b, and the identification information transmitting unit 21c is a software-based functional block implemented by the processing unit 21 executing a program (not shown) different from the program 22a which is to be subject to the update process.

The update information receiving unit 21a performs a process of receiving, at the communication unit 23, the update program transmitted from the gateway 4 via the communication line and accumulating the received update program into, for example, a buffer memory (not shown). The update processing unit 21b performs a process of updating the program 22a by writing, over the program 22a stored in the storage unit 22, the update program accumulated by the update information receiving unit 21a into the buffer for example. The identification information transmitting unit 21c performs a process of reading the identification information 22b from the storage unit 22 and transmitting the identification information 22b to the gateway 4, in response to a transmission request for the identification information received from the gateway 4.

Figure 3:
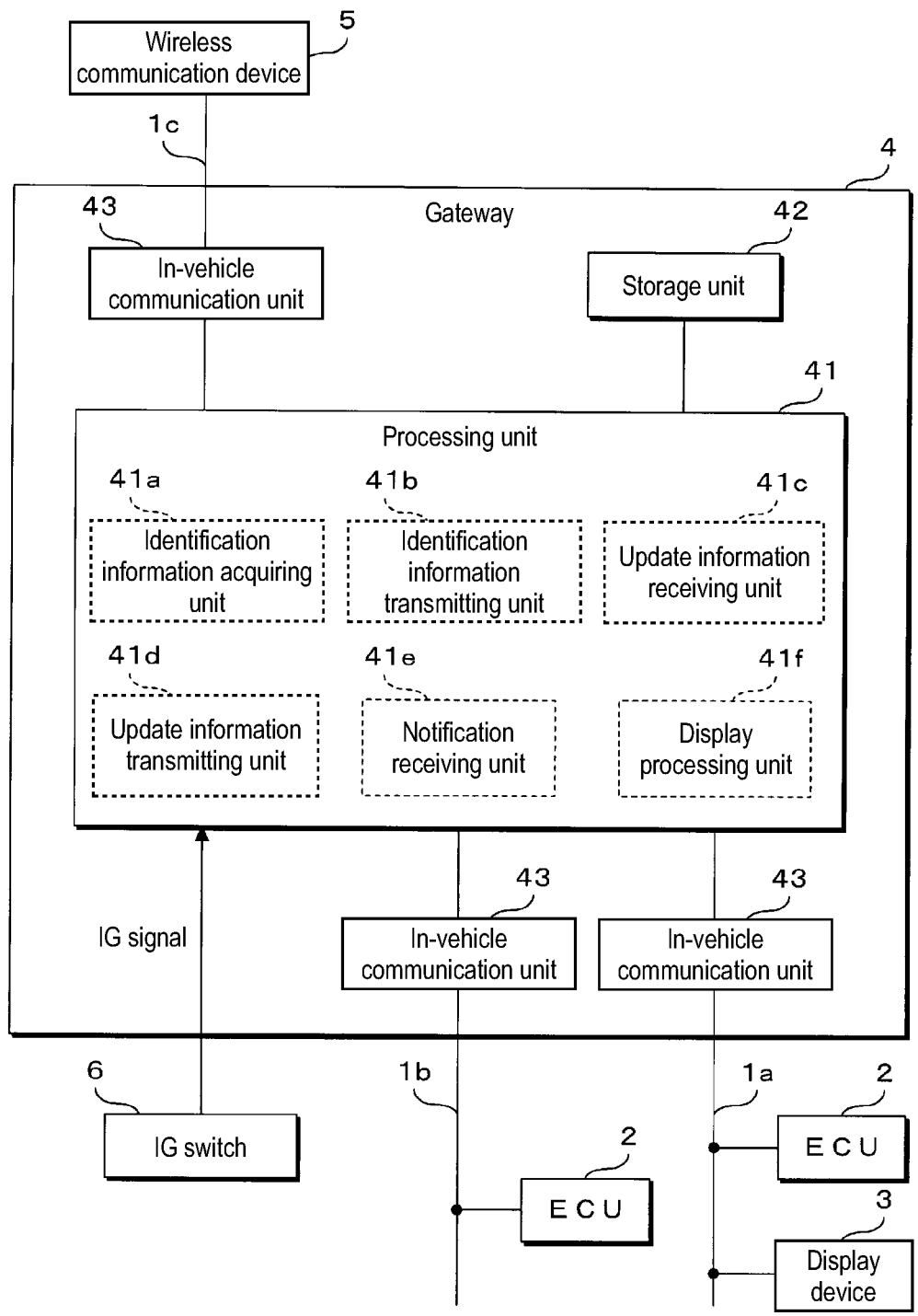
FIG. 3 is a block diagram showing a configuration of a gateway.

FIG. 3 is a block diagram showing a configuration of the gateway 4. The gateway 4 according to the present embodiment includes a processing unit 41, a storage unit 42, and three in-vehicle communication units 43. The processing unit 41 is made up of an arithmetic processing unit, such as a CPU or an MPU. The processing unit 41 performs various arithmetic processes by reading and executing a program stored in the storage unit 42 or in a ROM (not shown). The processing unit 41 according to the present embodiment performs arithmetic processes necessary for, for example: a process of relaying data transmission and reception among the communication lines 1a to 1c of the in-vehicle network; a process of updating the ECU 2; and a process of collecting the identification information of the ECU 2 and transmitting this information to the server 9. Moreover, the IG signal supplied from the IG switch 6 of the vehicle 1 is input to the processing unit 41. Here, the IG signal may be input into the gateway 4 through in-vehicle communication via the communication lines 1a to 1c.

The storage unit 42 is made up of a nonvolatile memory element, such as a flash memory or EEPROM. The storage unit 42 stores, for example, a program and data to be used for updating the ECU 2. The storage unit 42 may store the identification information collected from the ECU 2. The storage unit 42 may store a program to be executed by the processing unit 41 and data necessary to execute this program. Moreover, the storage unit 42 may store data generated during a process performed by the processing unit 41, for example.

The in-vehicle communication unit 43 is connected to the communication lines 1a to 1c included in the in-vehicle network, and performs data transmission and reception according to a communication protocol, such as CAN (Controller Area Network). The in-vehicle communication unit 43 transmits data by converting data received from the processing unit 41 into an electrical signal and outputting the electrical signal to the communication lines 1a to 1c. Moreover, the in-vehicle communication unit 43 receives data by acquiring the potentials of the communication lines 1a to 1c through sampling, and then transmits the received data to the processing unit 41. Here, the three in-vehicle communication units 43 included in the gateway 4 may perform respective communications according to different communication protocols.

Furthermore, the processing unit 41 includes an identification information acquiring unit 41a, an identification information transmitting unit 41b, an update information receiving unit 41c, an update information transmitting unit 41d, a notification receiving unit 41e, and a display processing unit 41f. Each of these units included in the processing unit 41 is a software-based functional block implemented by execution of a program stored in, for example, the storage unit 42 or a ROM. Whenever the IG switch of the vehicle 1 is switched from the Off state to the On state, for example, the identification information acquiring unit 41a performs a process of transmitting, from the in-vehicle communication unit 43, a transmission request for the identification information to the ECU 2; acquiring the identification information transmitted from the ECU 2 in response to this transmission request; and storing the acquired identification information into the storage unit 42. After the completion of the process performed by the identification information acquiring unit 41a to acquire the identification information of all the ECUs 2 installed in the vehicle 1, the identification information transmitting unit 41b performs a process of transmitting, from the wireless communication device 5, the identification information of all the ECUs 2 stored in the storage unit 42 to the server 9.

The update information receiving unit 41c performs communication with the server 9 via the wireless communication device 5 at a predetermined timing to inquire whether the program 22a of the ECU 2 installed in the vehicle 1 needs to be updated. The inquiry as to whether updating is necessary may be made at the predetermined timing in a predetermined cycle, such as daily or weekly, or may be made whenever the IG switch 6 is switched from the Off state to the On state for example. When receiving a notification that updating is needed from the server 9, the update information receiving unit 41c receives, at the wireless communication device 5, the program and the data necessary for the updating (hereinafter, simply referred to as the update program) received from the server 9 and then stores the update program into the storage unit 42. At this time, the update information receiving unit 41c receives the update program for each of the ECUs 2 that need to be updated.

The update information transmitting unit 41d performs the update process on the program 22a stored in the storage unit 22 of the ECU 2 that is subject to the update process, by reading the update program acquired by the update information receiving unit 41c from the server 9 and stored into the storage unit 42 and then transmitting the read update program to the ECU 2. When more than one update program determined as being used for the update process is present, the update information transmitting unit 41d may transmit these update programs sequentially in an appropriate order or transmit these update programs in parallel. The update program transmitted from the update information transmitting unit 41d to the ECU 2 is deleted from the storage unit 42 (or, may not be deleted and thus stored until different data needs to be stored).

The notification receiving unit 41e performs a process of receiving, via the wireless communication device 5, a notification of abnormality transmitted from the server 9 if the server 9 determines that an abnormality is present on the basis of the identification information transmitted by the identification information transmitting unit 41b. When the notification receiving unit 41e receives the notification of abnormality from the server 9, the display processing unit 41*f* performs a process of displaying, on the display device 3, a message notifying that an invalid ECU 2 is connected to the vehicle 1. As a result, the display device 3 of the vehicle 1 displays a message saying "An invalid ECU (identification information: XXXX) is connected to the in-vehicle network", for example. This can notify the user that an invalid ECU 2 is connected as well as notifying the user of the identification information of the invalid ECU 2.

Figure 4:
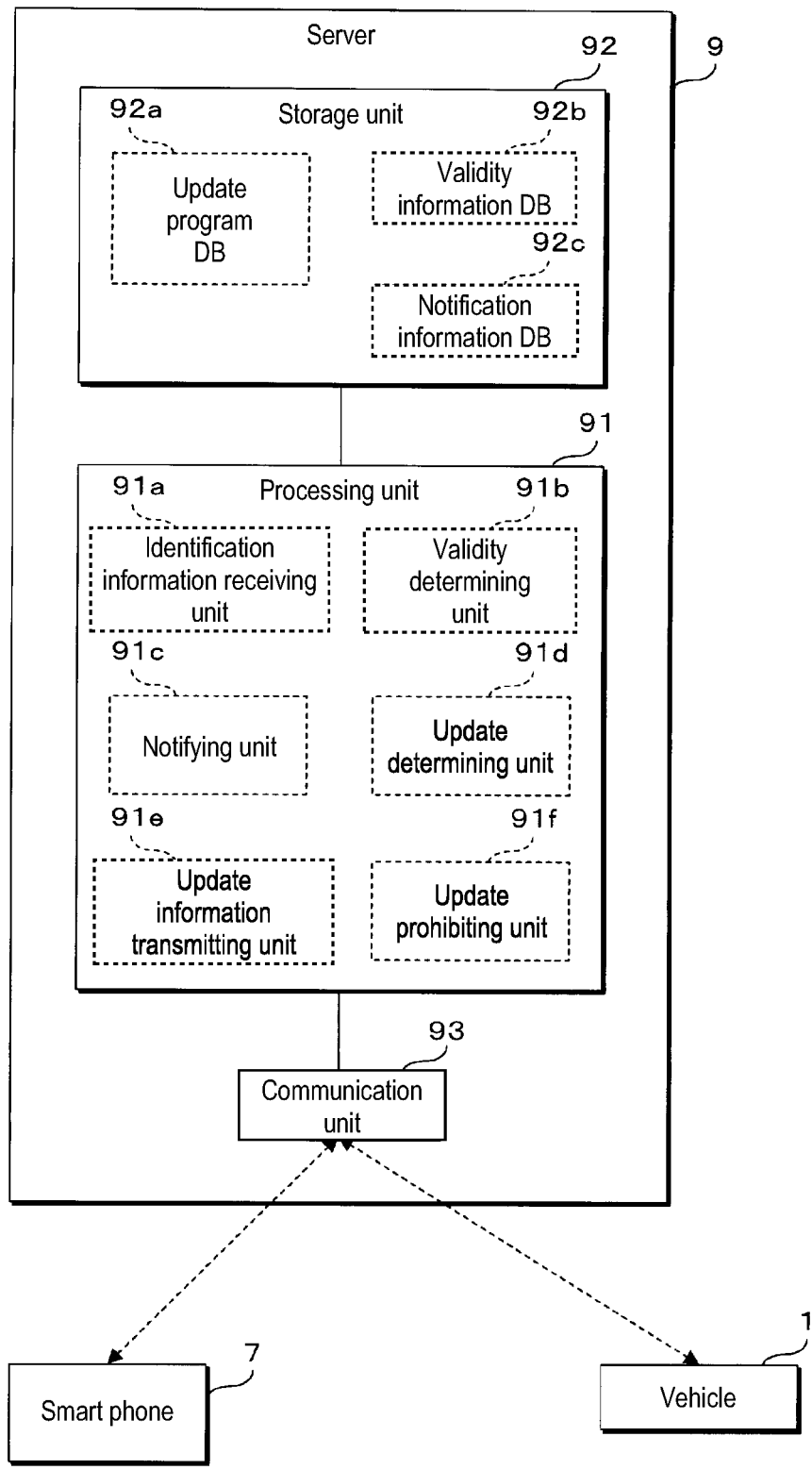
FIG. 4 is a block diagram showing a configuration of a server.

FIG. 4 is a block diagram showing a configuration of the server 9. The operational management of the server 9 according to the present embodiment is implemented by, for example, the manufacturer or sales company of the vehicle 1. The server 9 is provided at an appropriate location outside the vehicle 1. The server 9 can communicate with more than one vehicle 1, and collect and manage information for each of the vehicles 1. The server 9 includes a processing unit 91, a storage unit 92, and a communication unit 93. The processing unit 91 is made up of an arithmetic processing unit, such as a CPU or an MPU. The processing unit 91 performs various arithmetic processes related to the management of the vehicle 1, by reading and executing a server program stored in the storage unit 92. The processing unit 91 according to the present embodiment performs, for example: a process of delivering the update program of the ECU 2 installed in the vehicle 1; and a process of determining whether the ECU 2 installed in the vehicle 1 is valid.

The storage unit 92 is made up of a large-capacity storage device, such as a hard disk. The storage unit 92 stores the server program to be executed by the processing unit 91 and data necessary to execute the server program. The storage unit 92 also stores data generated during a process performed by the processing unit 91. Moreover, the storage unit 92 according to the present embodiment includes an update program DB (database) 92*a* storing the update program or data to be delivered to the vehicle 1. The update program DB 92*a* stores programs, as the update programs, in various versions for the ECUs 2 of various kinds that can be installed in the vehicles 1 of various kinds. The server 9 selects an appropriate one from among these programs and transmits the selected program to the vehicle 1.

Furthermore, the storage unit 92 includes a validity information DB 92*b* storing the identification information assigned to the ECUs 2 that are valid and that can be installed in the vehicle 1. The validity information DB 92*b* stores the information on, for example, a serial number or production number assigned to the hardware of the ECU 2, and also stores the version information of the program assigned to the software of the ECU 2, for example. The server 9 can determine whether this ECU 2 is valid by determining whether the identification information of the ECU 2 received from the vehicle 1 is included in the validity information DB 92*b* of the storage unit 92. Whenever an ECU 2 is manufactured or marketed, for example, the identification information of this ECU 2 is added to the invalidity information DB 92*b*.

Moreover, the storage unit 92 includes a notification information DB 92*c* storing information on a notification destination used when it is notified that the ECU 2 is invalid. In the notification information DB 92*c*, the information on, for example, the phone number or email address of the smartphone 7 owned by the user is stored in association with the vehicle 1. If it is determined that the ECU 2 is invalid on the basis of the identification information received from the vehicle 1, the server 9 can read the information on the notification destination stored in the notification information DB 92*c* in association with this vehicle 1 and then transmit an email to notify that an invalid ECU 2 is connected.

The communication unit 93 communicates with the vehicle 1 or the smartphone 7 via, for example, the Internet and the mobile phone communication network. The communication unit 93 transmits, to the desired vehicle 1 or the desired smartphone 7, a transmission message received from the processing 91. Moreover, the communication unit 93 transmits, to the processing unit 91, a message received from the vehicle 1 or the smartphone 7.

Furthermore, the processing unit 91 includes an identification information receiving unit 91*a*, a validity determining unit 91*b*, a notifying unit 91*c*, an update determining unit 91*d*, an update information transmitting unit 91*e*, and an update prohibiting unit 91*f*. Each of these units included in the processing unit 91 is a software-based functional block implemented by execution of the server program stored in the storage unit 92. The identification information receiving unit 91*a* performs a process of receiving the identification information collected from the ECU 2 installed in the vehicle 1 and transmitted from the gateway 4 of the vehicle 1 on a regular basis or at an appropriate timing. Here, the gateway 4 of the vehicle 1 transmits the identification information of all the ECUs 2 installed in the vehicle 1. Thus, the identification information receiving unit 91*a* receives the transmitted identification information of all the ECUs 2, and temporarily stores the received identification information into the storage unit 92 in association with the vehicle 1 that is the transmission source.

The validity determining unit 91*b* determines whether each of the ECUs 2 is valid by determining whether the identification information of all the ECUs 2 of the vehicle 1 received by the identification information receiving unit 91*a* is stored in the validity information DB 92*b* of the storage unit 92. The notifying unit 91*c* performs a process of transmitting, to the gateway 4 of the vehicle 1 including the ECU 2 determined to be invalid by the validity determining unit 91*b*, the notification that an invalid ECU 2 is installed. Moreover, by reference to the notification information DB 92*c* of the storage unit 92, the notifying unit 91*c* acquires the information on the notification destination stored in association with the vehicle 1 including the ECU 2 determined to be invalid by the validity determining unit 91*b*. Then, the notifying unit 91*c* performs a process of transmitting, to the smartphone 7 registered as the notification destination for example, the notification that an invalid ECU 2 is connected to the vehicle 1.

When receiving an inquiry from the gateway 4 of the vehicle 1 as to whether the program of the ECU 2 installed in the vehicle 1 needs to be updated, the update determining unit 91*d* performs a process of determining whether the program update is needed and transmitting, to the gateway 4, a result of the determination in response to the inquiry. When receiving a transmission request for the update program from the gateway 4 of the vehicle 1, the update information transmitting unit 91*e* performs a process of reading a program appropriate to the vehicle 1 that is the requesting source, from among the update programs stored in the update program DB 92*a* of the storage unit 92; and transmitting the read program to the vehicle 1 that is the requesting source. The update prohibiting unit 91*f* performs a process of prohibiting the update information transmitting 91*e* from transmitting the update program to the vehicle 1 including the ECU 2 determined to be invalid by the invalidity determining unit 91*b*.

Figure 5:
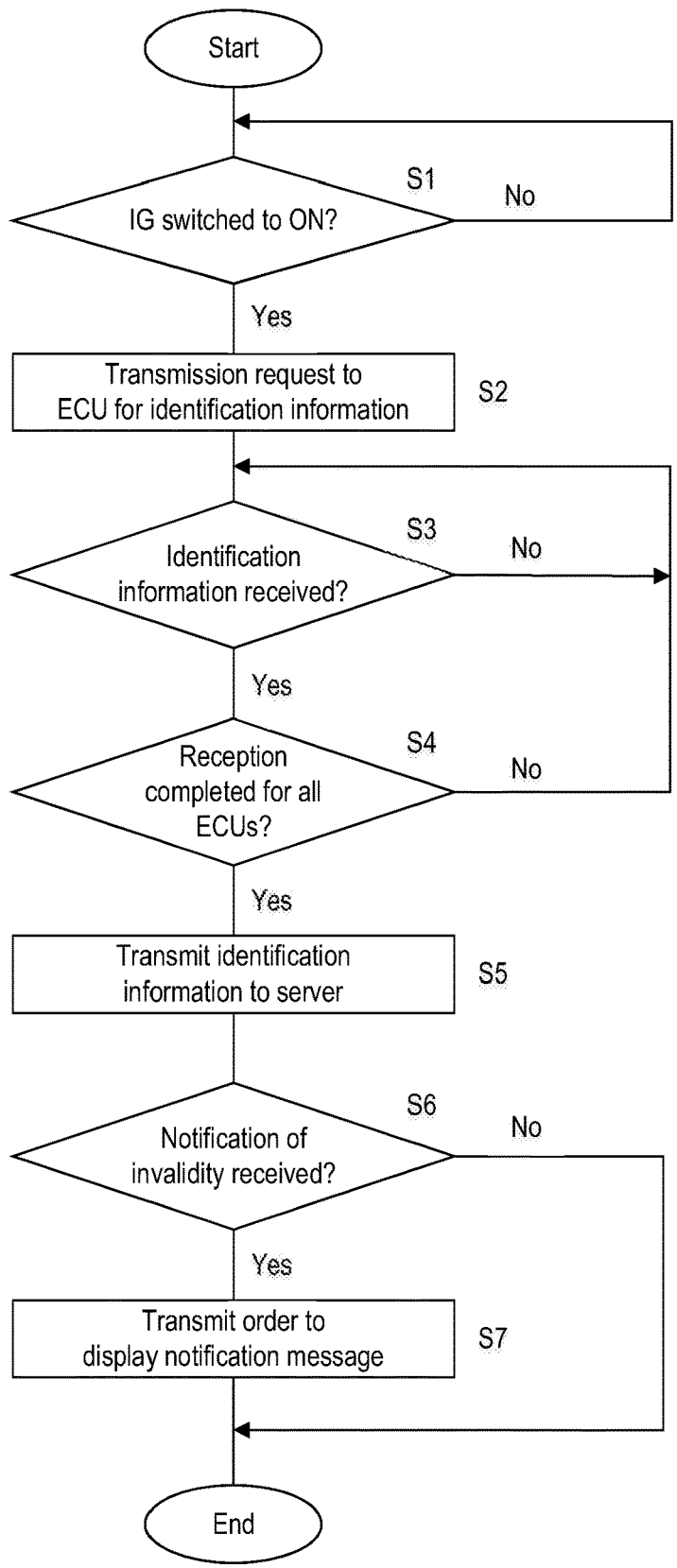
FIG. 5 is a flowchart of an identification information collecting process performed on the ECU by the gateway.

FIG. 5 is a flowchart of the identification information collecting process performed on the ECU 2 by the gateway 4. Note that this flowchart shows the process in the case where the IG switch of the vehicle 1 is in the Off state as the initial state. The identification information acquiring unit 41a of the processing unit 41 of the gateway 4 acquires the IG signal that is input from the IG switch 6 and determines whether the IG signal is switched from Off state to the On state (Step S1). If the IG signal is not switched to the On state (S1: NO), the identification information acquiring unit 41a waits until the IG signal is switched to the On state. If the IG signal is switched to the On state (S1: YES), the identification information acquiring unit 41a transmits, from the in-vehicle communication unit 43, a transmission request for the identification information to the ECU 2 connected to the communication lines 1a or 1b (Step S2).

The identification information acquiring unit 41a determines whether the identification information is received from the ECU 2 in response to the transmission request (Step S3). If not receiving the identification information from the ECU 2 (S3: NO), the identification information acquiring unit 41a waits until the identification information is received. If receiving the identification information (S3: YES), the identification information acquiring unit 41a determines whether the reception of the identification information is completed for all the ECUs 2 installed in the vehicle 1 (Step S4). If the identification information is not received from at least one of the ECUs 2 (S4: NO), the identification information acquiring unit 41a returns to Step S3.

When the reception of the identification information is completed for all the ECUs 2 (S4: YES), the identification information transmitting unit 41b of the processing unit 41 transmits the identification information of all the ECUs 2 to the server 9 via the wireless communication device 5 (Step S5). In response to the transmission of the identification information, the server 9 determines whether the ECU 2 is valid on the basis of the received identification information and notifies the gateway 4 of the result of the determination. The notification receiving unit 41e of the processing unit 41 of the gateway 4 receives the notification from the server 9 via the wireless communication device 5, and determines whether a notification of invalidity indicating that the ECU 2 is invalid is received from the server 9 as the result of the determination (Step S6). If not receiving the notification of invalidity (S6: NO), the processing unit 41 ends the process. If receiving the notification of invalidity (S6: YES), the display processing unit 41f of the processing unit 41 transmits, from the in-vehicle communication unit 43 to the display device 3, a display order to display a message notifying that an invalid ECU 2 is connected to the vehicle 1 (Step S7), and then ends the process.

According to the flowchart in FIG. 5, the process of collecting the identification information of the ECU 2 and transmitting the identification information to the server 9 is performed when the IG switch 6 is switched to the On state. However, this is not intended to be limiting. For example, the gateway 4 may also perform the process of collecting the identification information of the ECU 2 and transmitting the identification information to the server 9, with a frequency, such as once a day, once a week, or once a month. Moreover, the gateway 4 may also perform the process of collecting and transmitting the identification information when the IG switch 6 is switched to the Off state or at a different timing.

Figure 6:
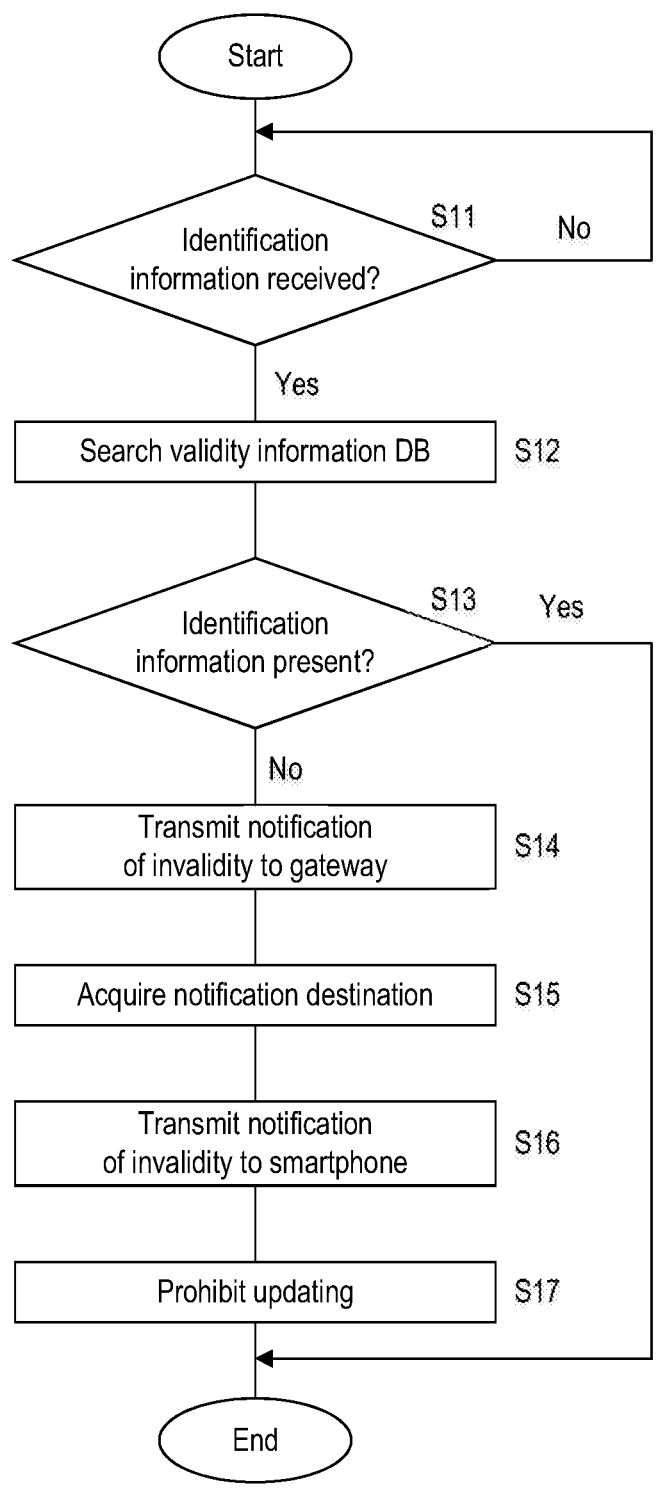
FIG. 6 is a flowchart of a validity determining process performed on the ECU by the server.

FIG. 6 is a flowchart of the validity determining process performed on the ECU 2 by the server 9. Note that the server 9 performs the process shown in this diagram individually for each of the vehicles 1 subjected to the management. The identification information receiving unit 91a of the processing unit 91 of the server 9 determines whether the communication unit 93 receives the identification information of the ECU 2 from the gateway 4 of the vehicle 1 (Step S11). If not receiving the identification information (S11: NO), the identification information receiving unit 91a waits until the identification information is received. If receiving the identification information from the vehicle 1 (S11: YES), the validity determining unit 91b of the processing unit 91 searches the identification information stored in the validity information DB 92b of the storage unit 92 (Step S12), and determines whether all pieces of the identification information received in Step S11 are stored in the validity information DB 92b (Step S13). If all pieces of the received identification information are stored in the validity information DB 92b (S13: YES), the validity determining unit 91b determines that all the ECUs 2 installed in the vehicle 1 are valid and ends the process. At this time, the server 9 may transmit the response indicating that all the ECUs 2 are valid, to the gateway 4 that is the transmission source of the identification information.

If at least one piece of the identification information is not stored in the validity information DB 92b (S13: NO), the validity determining unit 91 determines that the ECU 2 having the identification information not stored in the database is invalid. The notifying unit 91c of the processing unit 91 transmits, from the communication unit 93 to the gateway 4 that is the transmission source of this identification information, a message notifying that an invalid ECU 2 is installed and also including the information on the ECU 2 determined to be invalid (Step S14). By reference to the notification information DB 92c of the storage unit 92, the notifying unit 91c acquires the notification destination of the user stored in association with the vehicle 1 having the invalid ECU 2 (Step S15). The notifying unit 91c transmits, from the communication unit 93 to the smartphone 7 acquired as the notification destination for example, the message notifying that an invalid ECU 2 is installed in the vehicle 1 and also including the information on the ECU 2 determined to be invalid (Step S16). Moreover, the update prohibiting unit 91f of the processing unit 91 prohibits subsequent transmission of the update program to the vehicle 1 including the ECU 2 determined to be invalid (Step S17), and ends the process.

After prohibiting the transmission of the update program, the server 9 may remove the prohibition on the transmission of the update program when it is verified by, for example, the dealer of the vehicle 1 or a maintenance factory that the invalid ECU 2 is dismounted and thus an order to remove the prohibition is received from the dealer or the maintenance factory. Alternatively, the server 9 may remove the prohibition on the transmission of the update program when, for example, determining that all the ECUs 2 are valid as a result of determination performed on the basis of the identification information transmitted from the vehicle 1 next time. Or, the server 9 may remove the prohibition on the transmission of the update program on the basis of a factor other than the above examples.

Figure 7:
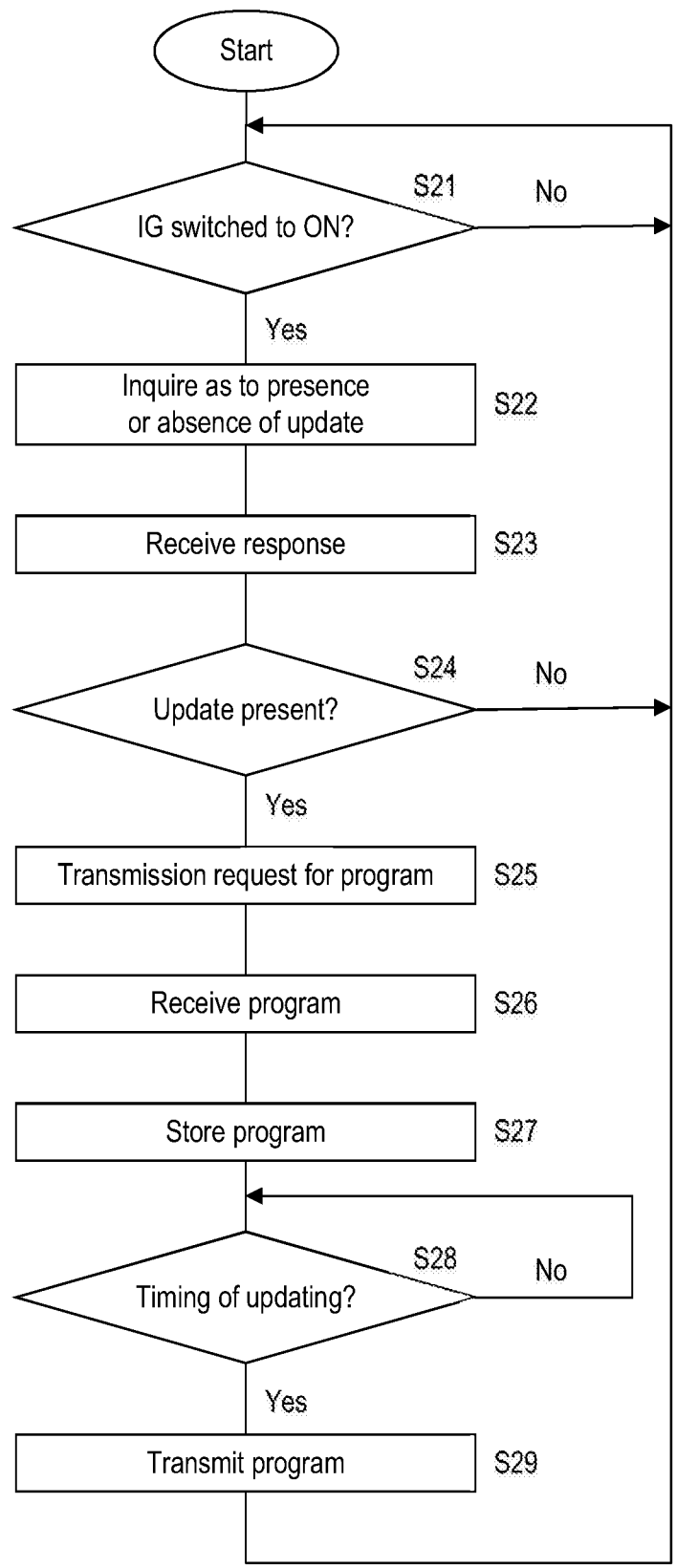
FIG. 7 is a flowchart of an update process performed by the gateway.

FIG. 7 is a flowchart of the update process performed by the gateway 4. The update information receiving unit 41c of the processing unit 41 of the gateway 4 acquires the IG signal that is input from the IG switch 6 and determines whether the IG signal is switched from the Off state to the On state (Step S21). If the IG signal is not switched to the On state (S21: NO), the update information receiving unit 41c waits until the IG signal is switched to the On state. If the IG signal is switched to the On state (S21: YES), the update information receiving unit 41c performs wireless communication via the wireless communication device 5, and inquires of the server 9 as to whether an update of the program of the ECU 2 installed in the vehicle 1 is present (Step S22).

The update information receiving unit 41*c* receives the response from the server 9 transmitted in response to the inquiry, via the wireless communication device 5 (Step S23). The update information receiving unit 41*c* determines whether an update of the program of the ECU 2 installed in the vehicle 1 is present on the basis of the response from the server 9 (Step S24). If no update is present (S24: NO), the update information receiving unit 41*c* returns to Step S21. If the update is present (S24: YES), the update information receiving unit 41*c* requests the server 9 to transmit the update program (Step S25). The update information receiving unit 41*c* receives, via the wireless communication device 5, the update program transmitted from the server 9 in response to the request (Step S26), and stores the received update program into the storage unit 42 (Step S27).

Next, the update information transmitting unit 41*d* of the processing unit 41 determines whether it is the timing of performing the update process on the ECU 2 now (Step S28). The update information transmitting unit 41*d* may determine that it is the timing of performing the update process now when, for example, the IG switch 6 of the vehicle 1 is switched to the Off state. Alternatively, the update information transmitting unit 41*d* may determine that it is the timing of performing the update process now when, for example, it is a predetermined time, such as two o'clock in the morning. The timing at which the update process is performed is not limited to the above examples, and the update process may be performed at various timings. If it is determined that it is not the timing of performing the update process now (S28: NO), the update information transmitting unit 41*d* waits until the timing of the update process comes. If it is determined that it is the timing of performing the update process now (S28: YES), the update information transmitting unit 41*d* performs the update process by transmitting, from the in-vehicle communication unit 43, the update program stored in the storage unit 42 to the ECU 2 that is to be updated (Step S29), and returns to Step S21.

Figure 8:
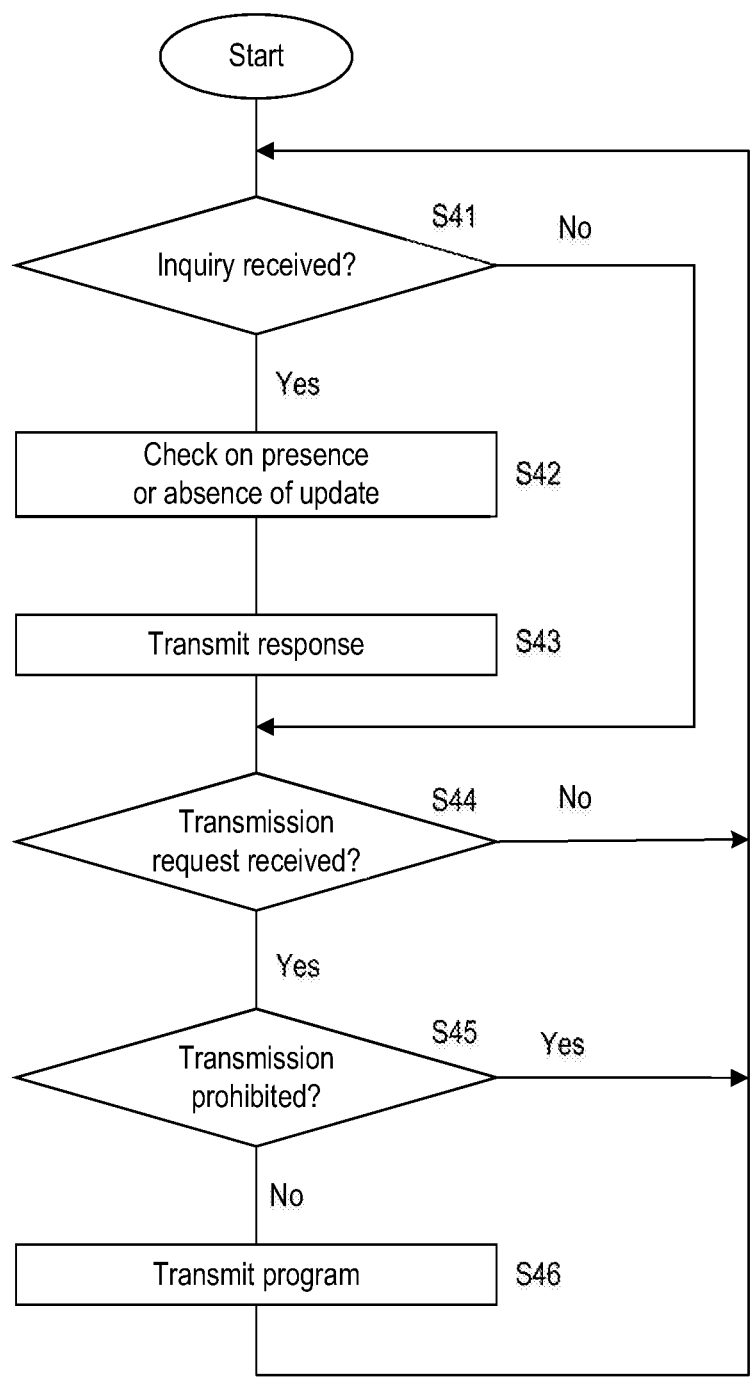
FIG. 8 is a flowchart of an update process performed by the server.

FIG. 8 is a flowchart of the update process performed by the server 9. Note that the server 9 performs the process shown in this diagram individually for each of the vehicles 1 subjected to the management. The update determining unit 91*d* of the processing unit 91 of the server 9 determines whether the inquiry is received from the vehicle 1 as to whether the update of the ECU 2 is present (Step S41). If not receiving the inquiry (S41: NO), the update determining unit 91*d* proceeds to Step S44. If receiving the inquiry (S41: YES), the update determining unit 91*d* checks on the presence or absence of the update of the program of the ECU 2 installed in the vehicle 1 that is the inquiry source (Step S42). For example, when the inquiry transmitted from the gateway 4 includes the version information of the program of the ECU 2 installed in the vehicle 1, the update determining unit 91*d* can determine whether the update of the program is present by determining whether the version information included in the inquiry indicates a latest version. Moreover, the server 9 may make and manage a database of the version information of the programs of the ECUs 2 for each of the vehicles 1, for example. In this case, the update determining unit 91*d* can determine whether the update is present by reference to this database. The update determining unit 91*d* transmits the result of the determination as to the presence or absence of the update obtained by the process in Step S42, as the response to the gateway 4 that is the inquiry source (Step S43), and proceeds to Step S44.

Next, the update information transmitting 91*e* of the processing unit 91 determines whether the transmission request for the update program is received from the gateway 4 of the vehicle 1 (Step S44). If not receiving the transmission request (S44: NO), the update information transmitting unit 91*e* returns to Step S41. If receiving the transmission request (S44: YES), the update information transmitting unit 91*d* determines whether the update prohibiting unit 91*f* prohibits the transmission of the update program to the vehicle 1 that is the transmission source of the request (Step S45). If the transmission of the update program is prohibited (S45: YES), the update information transmitting unit 91*e* returns to Step S41 without transmitting the update program. If the transmission of the update program is not prohibited (S45: NO), the update information transmitting unit 91*e* reads, from the update program DB 92*a* of the storage unit 92, the update program to be used for the update process performed on the ECU 2 of the vehicle 1 that is the request source, and transmits the read program to the gateway 4 of the vehicle 1 that is the request source (Step S46). Then, the process returns to Step S41.

According to the vehicle-mounted device determination system according to the present embodiment having the above configuration, the gateway 4 installed in the vehicle 1 communicates with one or more ECUs 2, collects the identification information of these ECUs 2, and transmits the collected identification information to the server 9 provided outside the vehicle. The server 9 stores the identification information of valid ECUs 2 in the validity information DB 92*b* of the storage unit 92, and determines whether the vehicle-mounted device having the identification information received from the gateway 4 of the vehicle 1 is valid. By determining whether the identification information received from the gateway 4 is included in the validity information DB 92*b* of the storage unit 92, the server 9 can determine whether the ECU 2 having this identification information is valid. If it is determined that the ECU 2 is invalid, the server 9 provides a corresponding notification. The validity information DB 92*b*, which is a collection of the identification information of the valid ECUs 2 has an enormous amount of data, and addition and correction may be frequently performed on this collection. Thus, with a configuration in which the server 9 stores such information in the storage unit 92 and determines whether the ECU 2 is valid, the determination as to the validity can be performed more accurately.

Moreover, according to the present embodiment, the update program used for updating the program 22*a* stored in the storage unit 22 of the ECU 2 is stored in the update program DB 92*a* of the storage unit 92 of the server 9. The server 9 determines for each of the ECUs 2 whether the program 22*a* of the ECU 2 of the vehicle 1 needs to be updated. Then, the server 9 transmits the update program to the gateway 4 of the vehicle 1 including the ECU 2 that is determined as being valid and as having the program that needs to be updated. Receiving the update program from the server 9, the gateway 4 performs the update process by transmitting the received update program to the ECU 2 that is to be updated. With this, the server 9 transmits the update program only to the valid ECU 2, and the update process is prohibited from being performed on the program of the invalid ECU 2.

Furthermore, according to the present embodiment, the server 9 does not transmit the update program to the vehicle 1 even if it is determined that the ECU 2 having the program that needs to be updated is present, when the vehicle 1 including the ECU 2 that is to be updated includes a vehicle-mounted device determined to be invalid. With this, the update process can be prevented from being performed on the vehicle 1 that may have some kind of abnormality.

Moreover, according to the present embodiment, if it is determined that the ECU 2 is invalid on the basis of the identification information received from the gateway 4, the server 9 provides notification, to the gateway 4 that is the transmission source of this identification information, that the ECU 2 is invalid. Receiving this notification, the gateway 4 notifies the user of the information on the ECU 2 determined to be invalid, by causing the display device 3 provided for the vehicle 1 to display the information. With this, the user of the vehicle 1 can find that an invalid ECU 2 is installed in the vehicle.

Furthermore, according to the present embodiment, if it is determined that the ECU 2 is invalid on the basis of the identification information received from the gateway 4, the server 9 provides notification to the mobile wireless communication device, such as the smartphone 7. For example, the server 9 can store, for each of the vehicles 1, the information on the wireless communication device that is the notification destination, in the notification information DB 92c of the storage unit 92. If it is determined that the ECU 2 is invalid, the server 9 can provide a notification to the stored notification destination. With this, even if not riding in the vehicle 1, the user can receive the notification with the wireless communication device such as the smartphone 7, and find that an invalid ECU 2 is installed in the vehicle 1.

In the present embodiment, the gateway 4 installed in the vehicle 1 collects the identification information of the ECU 2 and transmits the collected identification information to the server 9. Or, more specifically, the gateway 4 functions as an information collecting device. However, this is not intended to be limiting. A vehicle-mounted device other than the gateway 4, such as one of the ECUs 2, may perform the process as the information collecting device. Moreover, in the vehicle-mounted device determination system according to the present embodiment, the gateway 4 and the server 9 perform the update process on the program 22a of the ECU 2. This is not intended to be limiting. The system may also only determine whether the ECU 2 is valid and may not perform the update process.

Modification

In the present embodiment, even when only one of the ECUs 2 installed in the vehicle 1 is determined to be invalid, the transmission of the update program to the valid ECU 2 of the vehicle 1 that includes the aforementioned invalid ECU 2 is prohibited. This is not intended to be limiting. The server 9 may transmit, to the vehicle 1 including an ECU 2 determined to be invalid, the update program for those ECUs 2 that have been determined as being valid.

Embodiment 2

Figure 9:
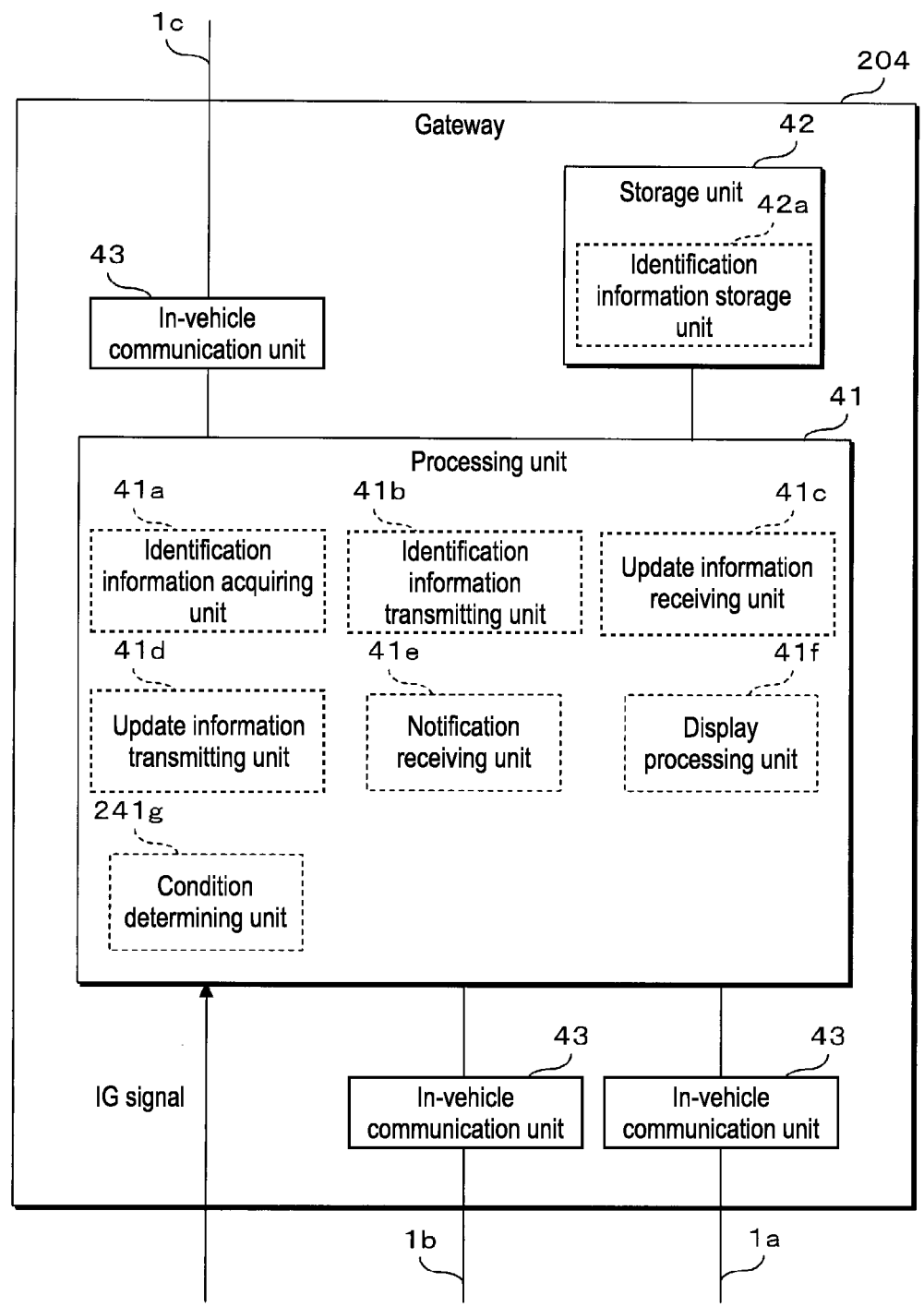
FIG. 9 is a block diagram showing a configuration of a gateway according to Embodiment 2.

FIG. 9 is a block diagram showing a configuration of a gateway 204 according to Embodiment 2. In a vehicle-mounted device determination system according to Embodiment 2, the gateway 204 that collects identification information of an ECU 2 does not transmit the collected identification information to a server 9. Instead of this, the gateway 204 determines whether the collected identification information satisfies a predetermined condition and then determines on the basis of the result of this determination whether to transmit the identification information to the server 9.

A storage unit 42 of the gateway 204 according to Embodiment 2 includes an identification information storage unit 42a that stores identification information acquired by an identification information acquiring unit 41a from a CPU 2. When an IG switch 6 is switched from an Off state to an On state, for example, the identification information acquiring unit 41a acquires the identification information of all the ECUs 2 installed in a vehicle 1 and stores the acquired identification information into the identification information storage unit 42a of the storage unit 42. Whenever the IG switch 6 is switched to the On state, the identification information acquiring unit 41a performs this process of acquiring and storing the identification information. The identification information storage unit 42a stores the identification information acquired in one process, that is, at least the identification information acquired when the IG switch is switched to the On state the previous time.

Moreover, a processing unit 41 of the gateway 204 according to Embodiment 2 additionally includes a condition determining unit 241g as a software-based functional block. The condition determining unit 241g determines whether the identification information acquired by the identification information acquiring unit 41a from the ECU 2 satisfies a predetermined condition. The condition determining unit 241g according to the present embodiment compares the identification information in the identification information storage unit 42a acquired the previous time with the identification information acquired by the identification information acquiring unit 41a the current time. Then, the condition determining unit 241 makes a determination according to the predetermined condition whether the identification information of the previous time is the same as the identification information of the current time. With this, the condition determining unit 241g can determine whether an ECU 2 is added or changed in an in-vehicle network of the vehicle 1.

Suppose that the condition determining unit 241g determines that the identification information stored in the identification information storage unit 42a is the same as the identification information acquired by the identification information acquiring unit 41a. In this case, since there is no change in the device configuration of the vehicle 1, an identification information transmitting unit 41b of the gateway 204 according to Embodiment 2 does not transmit the identification information to the server 9. On the other hand, suppose that the condition determining unit 241g determines that the identification information stored in the identification information storage unit 42a is not the same as the identification information acquired by the identification information acquiring unit 41a. In this case, since there is a change in the device configuration of the vehicle 1, the identification information transmitting 41b transmits the identification information acquired by the identification information acquiring unit 41a to the server 9 via a wireless communication device 5. A process performed by the server 9 when the identification information is received from the gateway 204 is the same as the process performed in the vehicle-mounted device determination system according to Embodiment 1.

Figure 10:
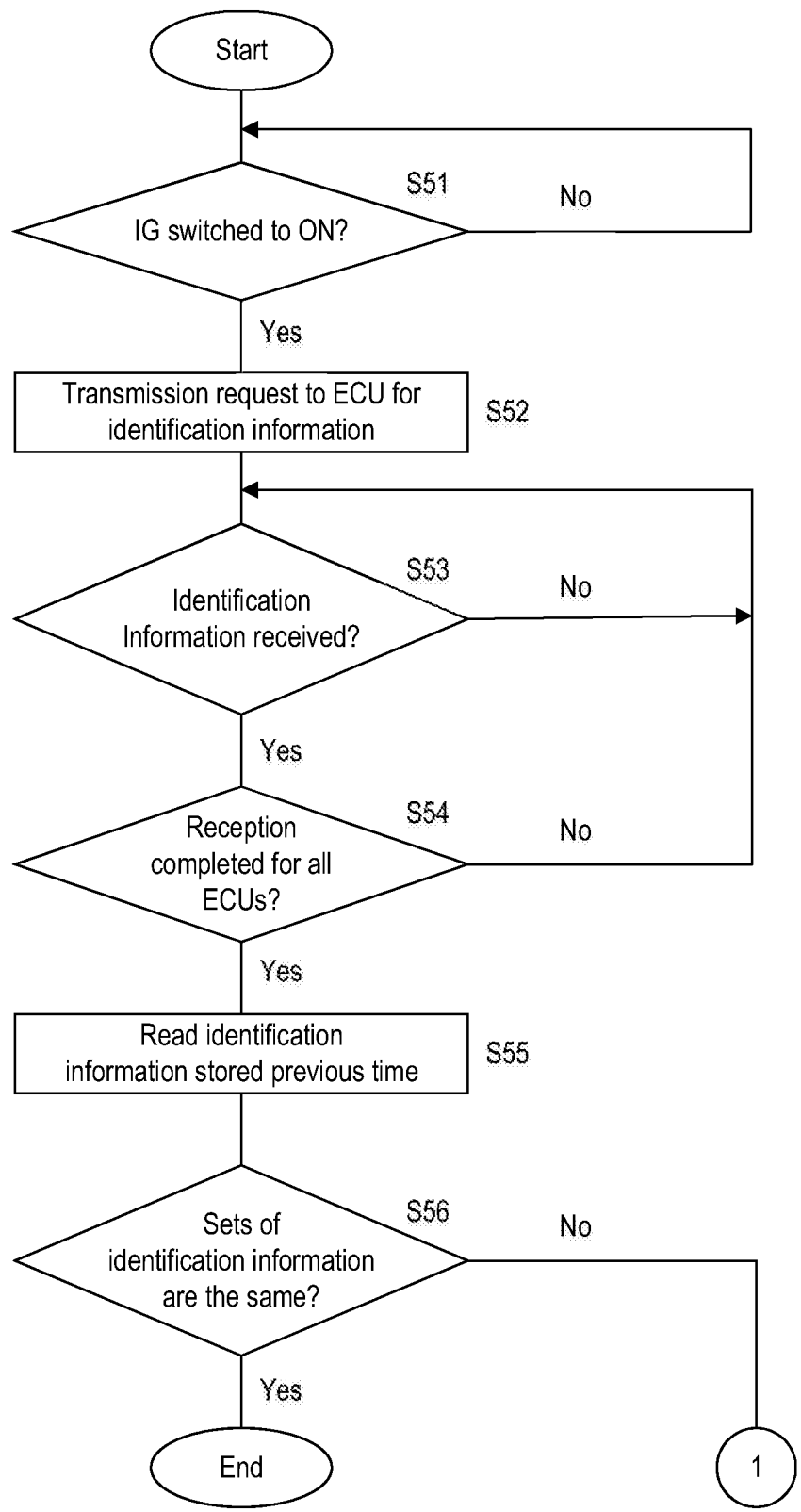
FIG. 10 is a flowchart of an identification information collecting process performed by the gateway according to Embodiment 2.
Figure 11:
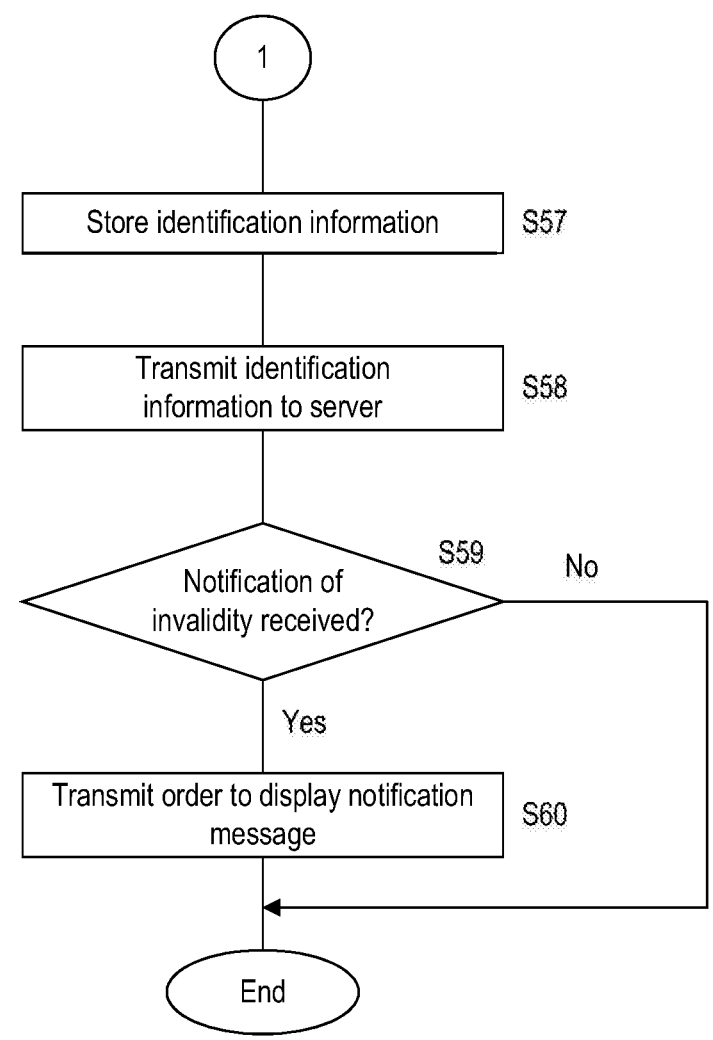
FIG. 11 is a flowchart of an identification information collecting process performed by the gateway according to Embodiment 2.

FIG. 10 and FIG. 11 are flowcharts of an identification information collecting process performed by the gateway 204 according to Embodiment 2. The identification information acquiring 41a of the processing unit 41 of the gateway 204 acquires an IG signal that is input from the IG switch 6 and determines whether the IG signal is switched from Off state to the On state (Step S51). If the IG signal is not switched to the On state (S51: NO), the identification information acquiring unit 41a waits until the IG signal is switched to the On state. If the IG signal is switched to the On state (S51: YES), the identification information acquiring unit 41a transmits, from an in-vehicle communication unit 43, a transmission request for the identification information to the ECU 2 connected to the communication lines 1a or 1b (Step S52).

The identification information acquiring unit 41a determines whether the identification information is received from the ECU 2 in response to the transmission request (Step S53). If not receiving the identification information from the ECU 2 (S53: NO), the identification information acquiring unit 41a waits until the identification information is received. If receiving the identification information (S53: YES), the identification information acquiring unit 41a determines whether the reception of the identification information is completed for all the ECUs 2 installed in the vehicle 1 (Step S54). If the identification information is not received from at least one of the ECUs 2 (S54: NO), the identification information acquiring unit 41a returns to Step S53.

When the reception of the identification information is completed for all the ECUs 2 (S4: YES), the condition determining unit 241g of the processing unit 41 reads, from the identification information storage unit 42a of the storage unit 42, the identification information acquired and stored the previous time (Step S55). The condition determining unit 241g determines whether the identification information acquired by the identification information acquiring unit 41a in Steps S52 to S54 the current time is the same as the identification information read in Step S55 from the identification information storage unit 42a (Step S56). If these two sets of the identification information are the same (S56: YES), the condition determining unit 241g ends the process.

If these two sets of the identification information are not the same (S56: NO), the processing unit 41 stores the identification information acquired by the identification information acquiring unit 41a in Steps S52 to S54 the current time into the identification information storage unit 42a (Step S57). The identification information transmitting unit 41b of the processing unit 41 transmits the identification information of all the ECUs 2 to the server 9 via the wireless communication device 5 (Step S58). A notification receiving unit 41e of the processing unit 41 determines whether a notification of invalidity indicating that the ECU 2 is invalid is received from the server 9 as the result of the determination (Step S59). If not receiving the notification of invalidity (S59: NO), the processing unit 41 ends the process. If receiving the notification of invalidity (S59: YES), a display processing unit 41f of the processing unit 41 transmits, from the in-vehicle communication unit 43 to a display device 3, a display order to display a message notifying that an invalid ECU 2 is connected to the vehicle 1 (Step S60), and then ends the process.

In the vehicle-mounted device determination system according to Embodiment 2 having the above configuration, the gateway 204 determines whether the identification information collected from the ECUs 2 of the vehicle 1 satisfies the predetermined condition. For example, the gateway 204 can periodically acquires the identification information from the ECU 2 and stores the acquired identification information into the identification information storage unit 42a. Then, the gateway 204 makes the determination according to the predetermined condition whether the stored identification information is the same as the identification information newly acquired. Thus, the gateway 204 can determine whether there is an addition or change to the ECUs 2 installed in the vehicle 1. If it is determined that the predetermined condition is not satisfied, the gateway 204 transmits the newly-acquired identification information to the server 9. Thus, when the predetermined condition is satisfied, the gateway 204 does not transmit the identification information to the server 9. With this, frequency of communication between the gateway 204 and the server 9 can be reduced.

According to the present embodiment, the gateway 204 makes the determination according to the predetermined condition whether the identification information stored in the identification information storage unit 42a is the same as the identification information newly acquired. However, the predetermined condition is not limited to this. For example, the gateway 204 may acquire a part of the identification information stored into the validity information DB 92b of the storage unit 92 by the server 9 and then store the acquired part into the storage unit 42. Then, the gateway 204 may make the determination according to a predetermined condition whether the identification information acquired by the identification information acquiring unit 41a is included in the information acquired from the server 9.

The rest of the configuration of the vehicle-mounted device determination system according to Embodiment 2 is the same as that of the vehicle-mounted device determination system according to Embodiment 1. Thus, the same components as those in Embodiment 1 are assigned the same numerals as in Embodiment 1, and detailed description on these components is omitted here.

The invention claimed is:

1. A vehicle-mounted device validity determination system, comprising an information collecting device and a server, the information collecting device including:
a communication unit configured to communicate with one or more vehicle-mounted devices installed in a vehicle;
an identification information acquiring unit configured to acquire identification information of the one or more vehicle-mounted devices through communication performed by the communication unit; and
an identification information transmitting unit configured to transmit, to the server provided outside the vehicle, the identification information of the one or more vehicle-mounted devices acquired by the identification information acquiring unit, and the server including:
an identification information storage unit configured to store identification information of a vehicle-mounted device that is valid and that can be installed in the vehicle;
an identification information receiving unit configured to receive the identification information of the vehicle-mounted device from the vehicle;
a validity determining unit configured to determine, on the basis of the identification information of the vehicle-mounted device stored in the identification information storage unit and the identification information of the vehicle-mounted device received by the identification information receiving unit, whether a vehicle-mounted device associated with the identification information of the vehicle-mounted device received by the identification information receiving unit is valid;
a notifying unit configured to provide a notification if the validity determining unit determines that the vehicle-mounted device is invalid;

an update program storage unit configured to store an update program used for updating a program to be executed by the vehicle-mounted device that is valid and that can be installed in the vehicle;

an update determining unit configured to determine whether the program to be executed by the vehicle-mounted device is to be updated; and an update program transmitting unit configured to, if the validity determining unit determines that the vehicle-mounted device is valid and the update determining unit determines that the program to be executed by the vehicle-mounted device is to be updated, read the update program for the vehicle-mounted device from the update program storage unit, and transmit the update program to the information collecting device of the vehicle including the vehicle-mounted device that is to be updated, and wherein the information collecting device further includes:
an update program receiving unit configured to receive the update program from the server; and
an update program transmitting unit configured to transmit the update program received by the update program receiving unit to the vehicle-mounted device that is to be updated, and wherein the server further includes:
an update prohibiting unit configured to prohibit the update program transmitting unit from transmitting the update program to all of the one or more vehicle-mounted devices determined to be valid by the validity determining unit when at least one of the one or more vehicle-mounted devices is determined to be invalid by the validity determining unit that does not include the one or more vehicle-mounted devices determined to be valid by the validity determining unit.

2. The vehicle-mounted device validity determination system according to claim 1,
wherein the notifying unit of the server is further configured to provide a notification to the information collecting device that is a transmission source of the identification information of the vehicle-mounted device received by the identification information receiving unit, and
wherein the information collecting device further includes a display processing unit configured to perform, in response to the notification provided from the server, a process of displaying notification information on a display unit provided for the vehicle.

3. The vehicle-mounted device validity determination system according to claim 2, wherein the notifying unit of the server is further configured to provide a notification to a mobile wireless communication device.

4. The vehicle-mounted device validity determination system according to claim 2,
wherein the information collecting device further includes a condition determining unit configured to determine whether the identification information of the one or more vehicle-mounted devices acquired by the identification information acquiring unit satisfies a predetermined condition, and
if the condition determining unit determines that the predetermined condition is not satisfied, the identification information transmitting unit is further configured to transmit the identification information of the one or more vehicle-mounted devices to the server.

5. The vehicle-mounted device validity determination system according to claim 1, wherein the notifying unit of the server is further configured to provide a notification to a mobile wireless communication device.

6. The vehicle-mounted device validity determination system according to claim 5,
wherein the information collecting device further includes a condition determining unit configured to determine whether the identification information of the one or more vehicle-mounted devices acquired by the identification information acquiring unit satisfies a predetermined condition, and
if the condition determining unit determines that the predetermined condition is not satisfied, the identification information transmitting unit is further configured to transmit the identification information of the one or more vehicle-mounted devices to the server.

7. The vehicle-mounted device validity determination system according to claim 1,
wherein the information collecting device further includes a condition determining unit configured to determine whether the identification information of the one or more vehicle-mounted devices acquired by the identification information acquiring unit satisfies a predetermined condition, and
if the condition determining unit determines that the predetermined condition is not satisfied, the identification information transmitting unit is further configured to transmit the identification information of the one or more vehicle-mounted devices to the server.

8. The vehicle-mounted device validity determination system according to claim 7,
wherein the information collecting device further includes a storage unit configured to store the identification information of the one or more vehicle-mounted devices acquired by the identification information acquiring unit, and
wherein the condition determining unit is further configured to make a determination according to the predetermined condition whether the identification information of the one or more vehicle-mounted devices acquired by the identification information acquiring unit is the same as the identification information of the one or more vehicle-mounted devices stored in the storage unit.

9. An information collecting device, comprising:
a communication unit configured to communicate with one or more vehicle-mounted devices installed in a vehicle;
an identification information acquiring unit configured to acquire identification information of the one or more vehicle-mounted devices through communication performed by the communication unit;
a condition determining unit configured to determine whether the identification information of the one or more vehicle-mounted devices acquired by the identification information acquiring unit satisfies a predetermined condition;
an identification information transmitting unit configured to, if the condition determining unit determines that the predetermined condition is not satisfied, transmit the identification information of the one or more vehicle-mounted devices acquired by the identification information acquiring unit to a server provided outside the vehicle, wherein the server includes:
- an identification information storage unit configured to store identification information of a vehicle-mounted device that is valid and that can be installed in the vehicle;
- an identification information receiving unit configured to receive the identification information of the vehicle-mounted device from the vehicle;
- a validity determining unit configured to determine, on the basis of the identification information of the vehicle-mounted device stored in the identification information storage unit and the identification information of the vehicle-mounted device received by the identification information receiving unit, whether a vehicle-mounted device associated with the identification information of the vehicle-mounted device received by the identification information receiving unit is valid;
- a notifying unit configured to provide a notification if the validity determining unit determines that the vehicle-mounted device is invalid;
- an update program storage unit configured to store an update program used for updating a program to be executed by the vehicle-mounted device that is valid and that can be installed in the vehicle;
- an update determining unit configured to determine whether the program to be executed by the vehicle-mounted device is to be updated; and
- an update program transmitting unit configured to, if the validity determining unit determines that the vehicle-mounted device is valid and the update determining unit determines that the program to be executed by the vehicle-mounted device is to be updated, read the update program for the vehicle-mounted device from the update program storage unit, and transmit the update program to the information collecting device of the vehicle including the vehicle-mounted device that is to be updated, and wherein the information collecting device further includes:
- an update program receiving unit configured to receive the update program from the server; and
- an update program transmitting unit configured to transmit the update program received by the update program receiving unit to the vehicle-mounted device that is to be updated, and wherein the server further includes:
- an update prohibiting unit configured to prohibit the update program transmitting unit from transmitting the update program to all of the one or more vehicle-mounted devices determined to be valid by the validity determining unit when at least one of the one or more vehicle-mounted devices is determined to be invalid by the validity determining unit that does not include the one or more vehicle-mounted devices determined to be valid by the validity determining unit.

* * * * *